(12) United States Patent
Kaneko

(10) Patent No.: US 9,469,077 B2
(45) Date of Patent: Oct. 18, 2016

(54) MOLDING ELEMENT COMPRISING CUTTING MEANS FOR MOLDING AND VULCANIZING A TIRE TREAD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Shuichi Kaneko, Tokyo (JP)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

(*) Notice: Subject to any disclaimer, the term of this patent is extended or adjusted under 35 U.S.C. 154(b) by 0 days.

(21) Appl. No.: 14/897,007

(22) PCT Filed: Jun. 6, 2014

(86) PCT No.: PCT/EP2014/061801
§ 371 (c)(1),
(2) Date: Dec. 9, 2015

(87) PCT Pub. No.: WO2014/198653
PCT Pub. Date: Dec. 18, 2014

(65) Prior Publication Data
US 2016/0129652 A1 May 12, 2016

(30) Foreign Application Priority Data
Jun. 14, 2013 (EP) .................................... 13172037

(51) Int. Cl.
*B29D 30/06* (2006.01)
*B29D 30/02* (2006.01)
(Continued)

(52) U.S. Cl.
CPC ........... *B29D 30/0606* (2013.01); *B29D 30/02* (2013.01); *B29D 30/68* (2013.01);
(Continued)

(58) Field of Classification Search
CPC ............. B29D 30/0606; B29D 30/68; B29D 2030/0612; B29D 2030/0613
See application file for complete search history.

(56) References Cited

U.S. PATENT DOCUMENTS 3,012,599 A 12/1961 Benson et al.
3,415,923 A 12/1968 Petersen
(Continued)

FOREIGN PATENT DOCUMENTS

GB 1124915 A 8/1968
WO 03089257 A1 10/2003
(Continued)

OTHER PUBLICATIONS

International Search Report for Priority Application PCT/EP2014/061801 Dated Aug. 20, 2014.

*Primary Examiner* — James Mackey
(74) *Attorney, Agent, or Firm* — Dickinson Wright PLLC

(57) ABSTRACT

A molding element of a mold for molding and vulcanizing a tire tread, this tread having a tread surface intended to come into contact with the ground when the tire is rolling. The molding element comprising a molding surface intended to mold part of the tire tread surface and a blade of a height intended to mold a sipe or a groove in the tread, this blade extending in a first direction of extension Y. The molding element has two cutting means positioned on either side of the blade at a certain distance from this blade. The molding element has a third cutting means of height extending in a second direction of extension X, this second direction of extension X making an angle α with the first direction Y which is between 75° and 105°. The height of the third cutting means is greater than the height of the blade.

3 Claims, 1 Drawing Sheet

(51) Int. Cl.
 *B29D 30/68* (2006.01)
 *B29K 21/00* (2006.01)
(52) U.S. Cl.
 CPC ............... *B29D2030/0612* (2013.01); *B29D 2030/0613* (2013.01); *B29D 2030/0616* (2013.01); *B29K 2021/00* (2013.01)

(56) References Cited

U.S. PATENT DOCUMENTS

| | | | |
|---|---|---|---|
| 3,432,888 A | 3/1969 | Brierley | |
| 4,553,918 A | 11/1985 | Yoda et al. | |
| 6,044,882 A | 4/2000 | Crawford | |
| 9,126,377 B2 * | 9/2015 | Duvernier | B29D 30/0606 |
| 9,149,995 B2 * | 10/2015 | Duvernier | B29D 30/0606 |
| 9,186,820 B2 * | 11/2015 | Perrin | B29D 30/0606 |
| 2005/0109436 A1 | 5/2005 | Bruant et al. | |
| 2008/0149260 A1 | 6/2008 | Orsat | |
| 2015/0000827 A1 * | 1/2015 | Duvernier | B29D 30/66 156/129 |
| 2015/0328934 A1 * | 11/2015 | Kaneko | B60C 11/03 425/363 |
| 2016/0121569 A1 * | 5/2016 | Kaneko | B29D 30/0606 264/163 |

FOREIGN PATENT DOCUMENTS

| | | |
|---|---|---|
| WO | 2006069912 A1 | 7/2006 |
| WO | 2013087829 A1 | 6/2013 |

* cited by examiner

MOLDING ELEMENT COMPRISING CUTTING MEANS FOR MOLDING AND VULCANIZING A TIRE TREAD

This application is a 371 national phase entry of PCT/EP2014/061801, filed 6 Jun. 2014, which claims benefit of European Patent Application No. 13172037.7, filed 14 Jun. 2013, the contents of which are incorporated herein by reference for all purposes.

BACKGROUND

The present disclosure relates to the field of molds for molding and vulcanizing a tire tread. More specifically, the disclosure relates to the molds used for molding in the tread grooves which are partially or completely covered by an additional cover layer.

DESCRIPTION OF RELATED ART

It is known practice to design tires the tread of which comprises various rubber compounds. Document WO 03089257 discloses such treads. More specifically, document WO 03089257 discloses a tread comprising grooves the walls of which are covered with a cover layer. The material of which this cover layer is made differs from the rubber compound of which the tread is made. This material notably has much better wet grip than the wet grip of the rubber compound. This allows a very significant improvement in cornering performance on wet ground.

One way of manufacturing this tread is notably disclosed in document WO 2006069912. According to this method of manufacture, in a first step, provision is made for the material intended to constitute a cover layer to be injected in the form of one or more inserts into the green tire using an injection nozzle. The insert or inserts is or are then shaped, in a second step, by ribs of a vulcanizing mold so that they cover all or part of the walls of the grooves molded by these ribs.

This method of manufacture has its limits, particularly as far as obtaining precision moldings is concerned. Specifically, during the shaping thereof, the insert experiences a significant shear force from the rib in order to convert this insert into a layer of lesser thickness. This shear force may cause cracking within the insert, making it more difficult to control the movements of the material of which this insert is made. The shape and the thickness of the cover layer thus formed may therefore be somewhat haphazard. The advantages afforded by the additional layer to the performance of the tire are then reduced.

In addition, in this method of manufacture, it is necessary to make the inserts align with the ribs. This makes manufacture of the tread more complicated.

There is therefore a need to improve the incorporation of a cover layer on the walls of grooves of a tire tread.

DEFINITIONS

A "tire" means all types of elastic tire whether or not subjected to an internal pressure.

A "green tire" or "green form" of a tire means a superposition of a plurality of semi-finished rubber products present in the form of strips or sheets, with or without reinforcement. The green tire is intended to be vulcanized in a mold in order to obtain the tire.

The "tread" of a tire means a quantity of rubber material bounded by lateral surfaces and by two main surfaces one of which is intended to come into contact with a road surface when the tire is running.

A "tread surface" means the surface formed by those points on the tire tread that come into contact with the road surface when the tire is running.

A "mold" means a collection of separate molding elements which, when brought closer towards one another, delimit a toroidal molding space.

A "molding element" of a mold means part of a mold. A molding element is, for example, a mold segment.

A "molding surface" of a molding element means the surface of the mold that is intended to mold the surface of the tire tread.

A "blade" of a molding element means a protrusion projecting from the molding surface. In the blades category, a distinction is made between sipe blades which are less than 2 mm wide and ribs which have a width of 2 mm or more. Sipe blades are intended to mold sipes in the tire tread, which means cuts which at least partially close up when they fall within the contact patch where the tire makes contact with the ground. The ribs are intended to mold grooves in the tread, which means cuts which do not close up when they fall within the contact patch in which the tire makes contact with the ground.

SUMMARY

The invention, in an embodiment, relates to a molding element of a mold for molding and vulcanizing a tire tread. This tread comprises a tread surface intended to come into contact with the ground when the tire is rolling. The molding element comprises a molding surface intended to mold part of the tire tread surface and a blade of length L and of height H intended to mold a sipe or a groove in the tread. The blade extends along the length L of the blade in a first direction of extension Y. Indeed, the molding element comprises two cutting means positioned on either side of the blade at a certain distance from this blade. Indeed, the molding element comprises a third cutting means of height Hc extending in a second direction of extension X, this second direction of extension X making an angle $\alpha$ with the first direction Y which is comprised between 45° and 135°. The height Hc of the third cutting means is greater than the height H of the blade.

The cutting means are able to cut a cover layer that covers a green tire. The blade itself will mold a groove in the tread and at the same time guide part of the cover layer into the groove thus molded.

The invention, in an embodiment, thus proposes that the cover layer is cut at different time. Firstly, the third cutting means cut the layer along the second direction of extension X. Then, the layer is cut along the first direction Y by the two cutting means and in the same time, this layer is guided by the blade into the groove. Thus, the cover layer has not at the same time two directional cutting tensions (direction X and Y). As a result, the guidance of the cover layer by the blade into the groove is improved and the walls of the groove are better covered by this cover layer.

In a variant, the difference between the height Hc of the third cutting means and the height H of the blade is comprised between 0.1 mm and 1 mm.

In another variant, the difference between the height Hc of the third cutting means and the height H of the blade is equal to 0.5 mm.

BRIEF DESCRIPTION OF THE DRAWINGS

Other features and advantages of the embodiments of the invention will emerge from the following description, given by way of non-limiting example, with reference to the attached drawings in which.

DETAILED DESCRIPTION OF SPECIFIC EMBODIMENTS

In the description that follows, elements that are substantially identical or similar will be denoted by identical references.

Figure 1:
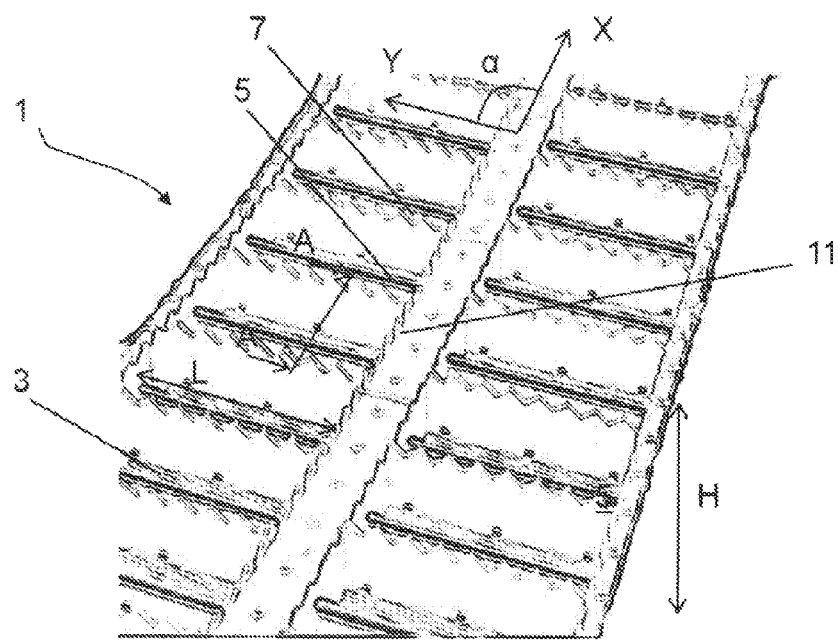
FIG. 1 shows a perspective view of a part of a molding element according to the embodiment of the invention.

FIG. 1 depicts a perspective view of a part of a molding element according to the embodiment of the invention. The molding element comprises blade 5 intended to mold a sipe or a groove in the tread, and two cutting means 7 positioned on either side of the blade at a certain distance from this blade. This two cutting means 7 extend in a direction of extension Y with a length L, parallel to the direction of extension of the blade 5.

The molding element comprises also a third cutting means extending in a second direction of extension X. This second direction of extension X making angle α with the first direction Y. This angle α is comprised between 45° and 135°.

In the example of FIG. 1, the direction X is the circumferential direction following the circumference of the mold and the direction Y is a transverse direction perpendicular to the circumferential direction of the mold.

Figure 2:
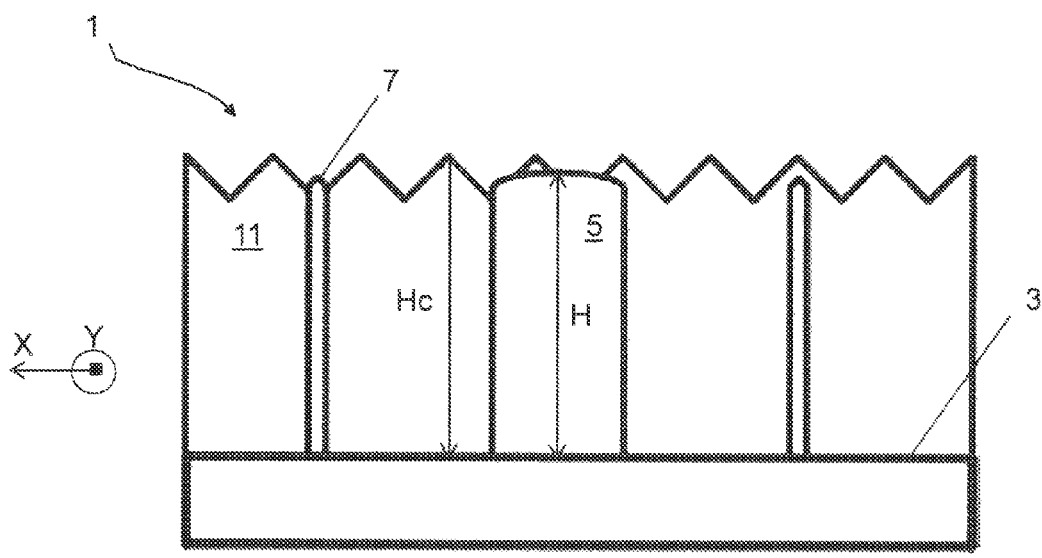
FIG. 2 is a sectional view taken along A-A line in FIG. 1.

FIG. 2 is a sectional view taken along A-A line in FIG. 1. The molding element 1 comprises a molding surface 3 intended to mold part of the tread surface of a tire. As explained above, the molding element 1 comprises blades 5 of which just one is depicted here to make the embodiment of the invention easier to understand. The blade in this instance is a rib 5 comprising a rounded end and intended to mold a groove in the tire tread. A "groove" in a tread means a cut in this tread of a width, i.e. the distance separating two lateral walls of this groove, greater than 2 mm. The rib 5 extends heightwise and projects from this molding surface 3 with a height H.

The third cutting means 11 have a height Hc which is here greater than the height H of the blade 5.

In one preferred embodiment, the difference between the height Hc of the third cutting means and the height H of the blade 5 is comprised between 0.1 mm and 1 mm. Preferentially, this difference is equal to 0.5 mm.

The embodiments of the invention are not restricted to the examples described and depicted and various modifications can be made thereto without departing from its scope.

The cutting means 7, 11 comprise, here, at one hand an alternation of peaks and throughs. In another embodiment, this cutting means have a cutting edge extending continuously and having an acute angle, equal to or less than 90°, in order to cut the cover layer.

The invention claimed is:

1. A molding element of a mold for molding and vulcanizing a tire tread, this tread comprising
    a tread surface intended to come into contact with the ground when the said tire is rolling, this molding element comprising
    a molding surface adapted to mold part of the tire tread surface and
    a blade of a length L and of a height H that is adapted to mold a sipe or a groove in the tread, this blade extending along the length L of the blade in a first direction of extension Y,
    the molding element having two cutting means positioned on either side of the blade at a distance from this blade,
  wherein the molding element comprises a third cutting means of a height Hc extending in a second direction of extension X, this second direction of extension X making an angle α with the first direction Y which is between 45° and 135° and the height Hc of the third cutting means is greater than the height H of the blade.

2. The molding element according to claim 1, wherein the difference between the height Hc of the third cutting means and the height H of the blade is between 0.1 mm and 1 mm.

3. The molding element according to claim 1, wherein the difference between the height Hc of the third cutting means and the height H of the blade is equal to 0.5 mm.

* * * * *